US006639935B2

(12) United States Patent
Gibbons et al.

(10) Patent No.: US 6,639,935 B2
(45) Date of Patent: *Oct. 28, 2003

(54) OUT OF CHANNEL CYCLIC REDUNDANCY CODE METHOD FOR A DISCRETE MULTITONE SPREAD SPECTRUM COMMUNICATIONS SYSTEM

(75) Inventors: David Gibbons, Redmond, WA (US); Robert Lee Maxwell, Duvall, WA (US); David James Ryan, Seattle, WA (US)

(73) Assignee: AT&T Wireless Services, Inc., Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/902,730

(22) Filed: Jul. 12, 2001

(65) Prior Publication Data

US 2001/0040912 A1 Nov. 15, 2001

Related U.S. Application Data

(63) Continuation of application No. 08/803,831, filed on Feb. 24, 1997, now Pat. No. 6,289,037.

(51) Int. Cl.[7] .............................. H04B 1/69; H03D 1/00
(52) U.S. Cl. ....................................... 375/130; 375/342
(58) Field of Search ................................ 375/130, 132, 375/147, 342; 370/335, 320, 342; 371/43.4, 53

(56) References Cited

U.S. PATENT DOCUMENTS

| | | | |
|---|---|---|---|
| 5,054,035 A | 10/1991 | Tarallo et al. ............... 375/225 |
| 5,056,112 A | 10/1991 | Wei ............................ 375/280 |
| 5,130,987 A | 7/1992 | Flammer ..................... 375/202 |
| 5,278,862 A | 1/1994 | Vander Mey et al. ........ 375/200 |
| 5,367,539 A | 11/1994 | Copley ........................ 375/347 |
| 5,425,049 A | 6/1995 | Dent ............................ 375/202 |
| 5,509,020 A | 4/1996 | Iwakiri et al. ................. 371/43 |
| 5,561,686 A | 10/1996 | Kobayashi et al. .......... 375/200 |
| 5,610,951 A | 3/1997 | Higginson et al. ........... 375/364 |
| 5,703,902 A | 12/1997 | Ziv et al. ..................... 375/200 |
| 5,719,883 A | 2/1998 | Ayanoglu ..................... 371/35 |
| 5,745,479 A | 4/1998 | Burns et al. ................. 370/245 |
| 5,784,368 A | 7/1998 | Weigand et al. ............. 370/310 |
| 6,289,037 B1 * | 9/2001 | Gibbons et al. ............. 375/130 |

FOREIGN PATENT DOCUMENTS

| EP | 89/09965 | 10/1989 |
| EP | 0 667 695 | 8/1995 |
| WO | 97/05709 | 2/1997 |

\* cited by examiner

Primary Examiner—Khai Tran
(74) Attorney, Agent, or Firm—Perkins Coie LLP

(57) ABSTRACT

A new method makes the most efficient use of the scarce spectral bandwidth in a wireless discrete multitone spread spectrum communications system. Each remote station and each base station in the network prepares an error detection field, such as a cyclic redundancy code (CRC), on each block of data to be transmitted over the traffic channels. The sending station prepares an error detection message for transmission over the link control channel of the network. The sending station prepares the error detection message by forming a link control channel vector that will be spread using the discrete multitone spread spectrum (DMT-SS) protocol to distribute the data message over a plurality of discrete tone frequencies, forming a spread signal for the link control channel. A link control channel is associated with communications session using the traffic channels. The instant of transmission of the error detection message is allowed to be different from the instant of transmission of the data message. This permits the error detection messages to be transmitted when capacity is available on the link control channel. The receiving station buffers the error detection messages it receives from the link control channel, so that they are accessible by their block numbers. When the receiving station receives a data message on the traffic channel, it performs a CRC calculation on the data block in the message to obtain a resulting new CRC value. The new CRC value is also buffered at the receiving station with the block number so that it is accessible by its block number. Then, when both the received error message and the new CRC value are both available at the receiving station, they are matched by their common block number. The received CRC value in the error detection message is compared with the new CRC computed from the received data block. If the comparison determines that there is a difference in the values, then an error signal is generated.

10 Claims, 8 Drawing Sheets

OUT OF CHANNEL CYCLIC REDUNDANCY CODE METHOD FOR A DISCRETE MULTITONE SPREAD SPECTRUM COMMUNICATIONS SYSTEM

CROSS-REFERENCES TO RELATED APPLICATIONS

This is a continuation of application Ser. No. 08/803,831, filed Feb. 24, 1997 now U.S. Pat. No. 6,289,037.

The invention disclosed herein is related to the copending U.S. patent application by Siavash Alamouti, Doug Stolarz, and Joel Becker, entitled "VERTICAL ADAPTIVE ANTENNA ARRAY FOR A DISCRETE MULTITONE SPREAD SPECTRUM COMMUNICATIONS SYSTEM", Ser. No. 08/806,510, Feb. 24, 1997 filed on the same day as the instant patent application, assigned to AT&T Wireless Services, and incorporated herein by reference.

BACKGROUND OF THE INVENTION

1. Field of the Invention

This invention involves improvements to communications systems and methods in a wireless discrete multitone spread spectrum communications system.

2. Description of Related Art

Wireless communications systems, such as cellular and personal communications systems, operate over limited spectral bandwidths. They must make highly efficient use of the scarce bandwidth resource to provide good service to a large population of users. Code Division Multiple Access (CDMA) protocol has been used by wireless communications systems to efficiently make use of limited bandwidths. The protocol uses a unique code to distinguish each user's data signal from other users' data signals. Knowledge of the unique code with which any specific information is transmitted, permits the separation and reconstruction of each user's message at the receiving end of the communication channel.

Adaptive beamforming technology has become a promising technology for wireless service providers to offer large coverage, high capacity, and high quality service. Based on this technology, a wireless communication system can improve its coverage capability, system capacity, and performance significantly.

The personal wireless access network (PWAN) system described in the referenced Alamouti, Stolarz, et al. patent applications, uses adaptive beamforming combined with a form of the CDMA protocol known as discrete multitone spread spectrum (DMT-SS) to provide efficient communications between a base station and a plurality of remote units. Every effort must be made to avoid loading normal, high priority traffic channels with system management information that has a lower priority. An example of system management information is the characterization of channel quality factors that are not immediately needed to control the realtime operation of the network. What is needed is a way to offload the communication of system management information from high priority traffic channels.

SUMMARY OF THE INVENTION

The invention disclosed herein is a new method to make the most efficient use of the scarce spectral bandwidth in a wireless discrete multitone spread spectrum communications system. Each remote station and each base station in the network prepares an error detection code, such as a cyclic redundancy code (CRC), on each block of data to be transmitted over the traffic channels. The CRC value computed for a given block of data is a unique mapping of the data block that characterizes the data block. Any change in the data block will result in a different CRC value. Each data block to be sent is numbered with a block number to distinguish it from other data blocks being sent by a sending station. A data message is formed by concatenating the data block with the block number. A CRC value is computed for each data block. An error detection message is formed by concatenating the CRC value with the block number. The sending station prepares the data message by forming data vectors that will be spread using the discrete multitone spread spectrum (DMT-SS) protocol to distribute the data message over a plurality of discrete tone frequencies, forming a spread signal for the traffic channel. In accordance with the invention, the sending station prepares the error detection message for transmission over the link control channel of the network. The sending station prepares the error detection message by forming a link control channel vector that will be spread using the discrete multitone spread spectrum (DMT-SS) protocol to distribute the data message over a plurality of discrete tone frequencies, forming a spread signal for the link control channel. A link control channel is associated with communications session using the traffic channels. Normally, the link control channel carries control information needed by the sending and receiving stations during a session using the traffic channels. However, its capacity is under-utilized. In accordance with the invention, the instant of transmission of the error detection message is allowed to be different from the instant of transmission of the data message. This permits the error detection messages to be transmitted when capacity is available on the link control channel. The receiving station buffers the error detection messages it receives from the link control channel, so that they are accessible by their block numbers. When the receiving station receives a data message on the traffic channel, it performs a CRC calculation on the data block in the message to obtain a resulting new CRC value. The new CRC value is also buffered at the receiving station with the block number so that it is accessible by its block number. Then, when both the received error message and the new CRC value are both available at the receiving station, they are matched by their common block number. The received CRC value in the error detection message is compared with the new CRC computed from the received data block. If the comparison determines that there is a difference in the values, then an error signal is generated. The error signal can be processed and used in several ways. The error signal can initiate a negative acknowledgement signal to be send from the receiving station back to the sender requesting the sender to repeat the data block transmission. The error signal can initiate an update in the spreading and despreading weights at the receiving station in an effort to improve the signal and interference to noise ratio of the traffic channel. The error signal can initiate an alarm to be used for other realtime control. Or, the error signal can be logged for the compilation of a longer term report of the traffic channel quality.

Currently, the invention has advantageous applications in the field of wireless communications, such as cellular communications or personal communications, where bandwidth is scarce compared to the number of the users and their needs. Such applications may be effected in mobile, fixed, or minimally mobile systems. However, the invention may be advantageously applied to other, non-wireless, communications systems as well.

DESCRIPTION OF THE PREFERRED EMBODIMENT

Figure 1:
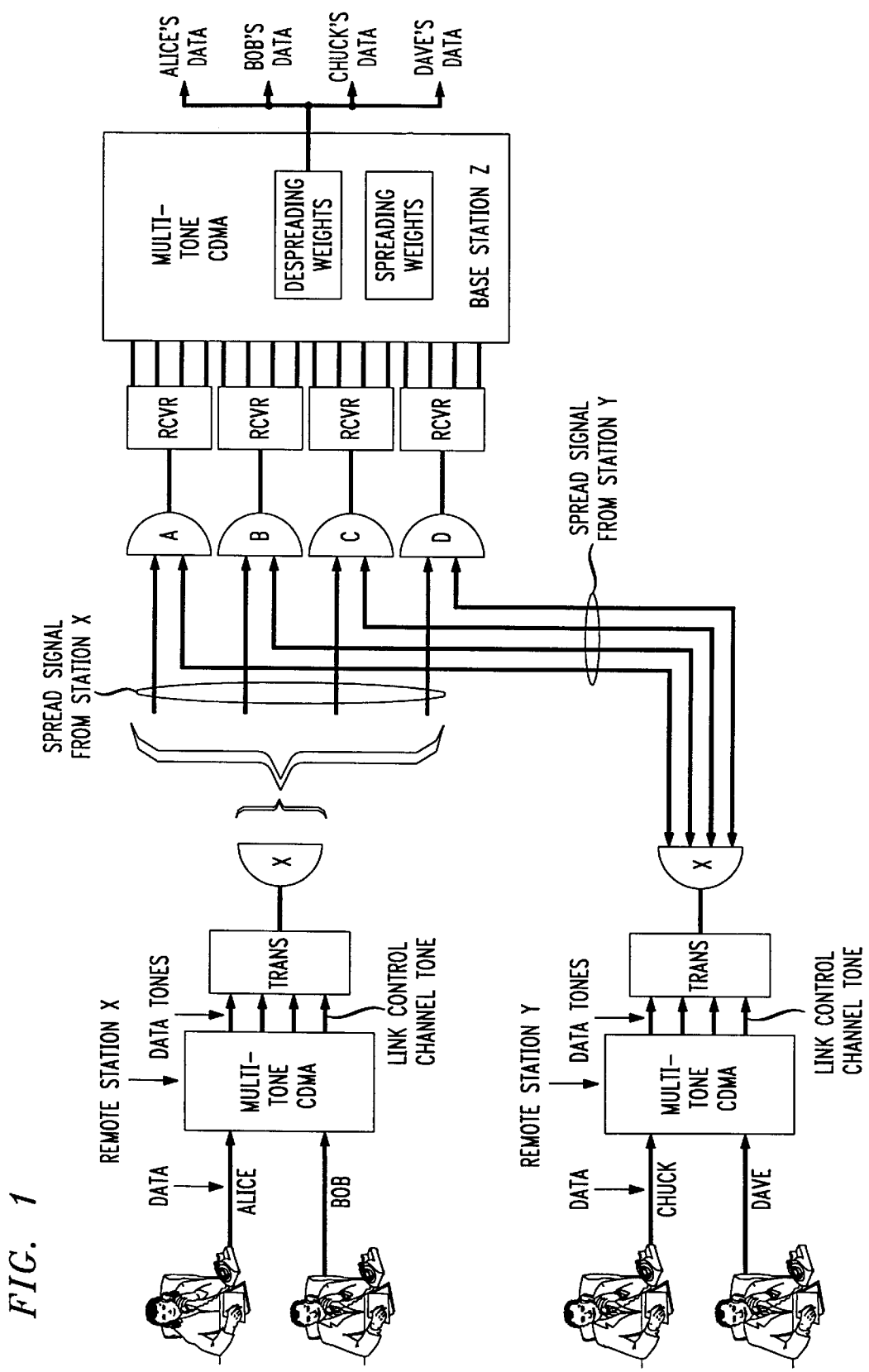
FIG. 1 is an architectural diagram of the PWAN system, including remote stations transmitting to a base station.

FIG. 1 an architectural diagram of the personal wireless access network (PWAN) system described in the referenced Alamouti, Stolarz, et al. patent applications. Two users, Alice and Bob, are located at the remote station X and wish to transmit their respective data messages to the base station Z. Station X is positioned to be equidistant from the antenna elements A, B, C, and D of the base station Z. Two other users, Chuck and Dave, are located at the remote station Y and also wish to transmit their respective data messages to the base station Z. Station Y is geographically remote from Station X and is not equidistant from the antenna elements A, B, C, and D of the base station Z. The remote stations X and Y and the base station Z use the form of the CDMA protocol known as discrete multitone spread spectrum (DMT-SS) to provide efficient communications between the base station and the plurality of remote station units. This protocol is designated in FIG. 1 as multi-tone CDMA. In this protocol, the user's data signal is modulated by a set of weighted discrete frequencies or tones. The weights are spreading weights that distribute the data signal over many discrete tones covering a broad range of frequencies. The weights are complex numbers with the real component acting to modulate the amplitude of a tone while the complex component of the weight acts to modulate the phase of the same tone. Each tone in the weighted tone set bears the same data signal. Plural users at the transmitting station can use the same tone set to transmit their data, but each of the users sharing the tone set has a different set of spreading weights. The weighted tone set for a particular user is transmitted to the receiving station where it is processed with despreading weights related to the user's spreading weights, to recover the user's data signal. For each of the spatially separated antennas at the receiver, the received multitone signals are transformed from time domain signals to frequency domain signals. Despreading weights are assigned to each frequency component of the signals received by each antenna element. The values of the despreading weights are combined with the received signals to obtain an optimized approximation of individual transmitted signals characterized by a particular multitone set and transmitting location. The PWAN system has a total of 2560 discrete tones (carriers) equally spaced in 8 MHZ of available bandwidth in the range of 1850 to 1990 MHZ. The spacing between the tones is 3.125 kHz. The total set of tones are numbered consecutively form 0 to 2559 starting from the lowest frequency tone. The tones are used to carry traffic messages and overhead messages between the base station and the plurality of remote units. The traffic tones are divided into 32 traffic partitions, with each traffic channel requiring at least one traffic partition of 72 tones.

In addition, the PWAN system uses overhead tones to establish synchronization and to pass control information between the base station and the remote units. A Common Link Channel (CLC) is used by the base to transmit control information to the Remote Units. A Common Access Channel (CAC) is used to transmit messages from the Remote Unit to the Base. There is one grouping of tones assigned to each channel. These overhead channels are used in common by all of the remote units when they are exchanging control messages with the base station.

In the PWAN system, Time Division Duplexing (TDD) is used by the base station and the remote unit to transmit data and control information in both directions over the same multi-tone frequency channel. Transmission from the base station to the remote unit is called forward transmission and transmission from the remote unit to the base station is called reverse transmission. The time between recurrent transmissions from either the remote unit or the base station is the TDD period. In every TDD period, there are four consecutive transmission bursts in each direction. Data is transmitted in each burst using multiple tones. The base station and each remote unit must synchronize and conform to the TDD timing structure and both the base station and the remote unit must synchronize to a framing structure. All remote units and base stations must be synchronized so that all remote units transmit at the same time and then all base stations transmit at the same time. When a remote unit initially powers up, it acquires synchronization from the base station so that it can exchange control and traffic messages within the prescribed TDD time format. The remote unit must also acquire frequency and phase synchronization for the DMT-SS signals so that the remote is operating at the same frequency and phase as the base station.

Selected tones within each tone set are designated as pilots distributed throughout the frequency band. Pilot tones carry known data patterns that enable an accurate channel estimation. The series of pilot tones, having known amplitudes and phases, have a known level and are spaced apart by approximately 30 KHz to provide an accurate representation of the channel response (i.e., the amplitude and phase distortion introduced by the communication channel characteristics) over the entire transmission band.

In accordance with the invention, each remote station and each base station in the network prepares an error detection code, such as a cyclic redundancy code (CRC), on each block of data to be transmitted over the traffic channels. A variety of error detecting codes can be used, in accordance with the invention. Polynomial codes, also known as cyclic redundancy codes, are preferred for the invention. The sender and receiver must agree on a generator polynomial in advance of the communication. A checksum is computed for a data block based on the generator polynomial. The checksum is a unique mapping of the data block. Any changes to the bit pattern of the datablock will result in a different checksum. Examples of error detecting codes for the preferred embodiment of the invention are given in Tanenbaum, "Computer Networks", second edition, Prentice-Hall, 1989. The CRC value computed for a given block of data is a unique mapping of the data block that characterizes the data block. Any change in the data block will result in a different CRC value. Each data block to be sent is numbered with a block number to distinguish it from other data blocks being sent by a sending station. A data message is formed by concatenating the data block with the block number. A CRC value is computed for each data block. An error detection message is formed by concatenating the CRC value with the block number. The sending station prepares the data message by forming data vectors that will be spread using the discrete multitone spread spectrum (DMT-SS) protocol to distribute the data message over a plurality of discrete tone frequencies, forming a spread signal for the traffic channel. In accordance with the invention, the sending station prepares the error detection message for transmission over the link control channel of the network. The sending station prepares the error detection message by forming a link control channel vector that will be spread using the discrete multitone spread spectrum (DMT-SS) protocol to distribute the data message over a plurality of discrete tone frequencies, forming a spread signal for the link control channel. A link control channel is associated with communications session using the traffic channels. Normally, the link control channel carries control information needed by the sending and receiving stations during a session using the traffic channels. However, its capacity is under-utilized. In accordance with the invention, the instant of transmission of the error detection message is allowed to be different from the instant of transmission of the data message. This permits the error detection messages to be transmitted when capacity is available on the link control channel. The receiving station buffers the error detection messages it receives from the link control channel, so that they are accessible by their block numbers. When the receiving station receives a data message on the traffic channel, it performs a CRC calculation on the data block in the message to obtain a resulting new CRC value. The new CRC value is also buffered at the receiving station with the block number so that it is accessible by its block number. Then, when both the received error message and the new CRC value are both available at the receiving station, they are matched by their common block number. The received CRC value in the error detection message is compared with the new CRC computed from the received data block. If the comparison determines that there is a difference in the values, then an error signal is generated. The error signal can be processed and used in several ways. The error signal can initiate a negative acknowledgement signal to be send from the receiving station back to the sender requesting the sender to repeat the data block transmission. The error signal can initiate an update in the spreading and despreading weights at the receiving station in an effort to improve the signal and interference to noise ratio of the traffic channel. The error signal can initiate an alarm to be used for other realtime control. Or, the error signal can be logged for the compilation of a longer term report of the traffic channel quality.

Figure 2:
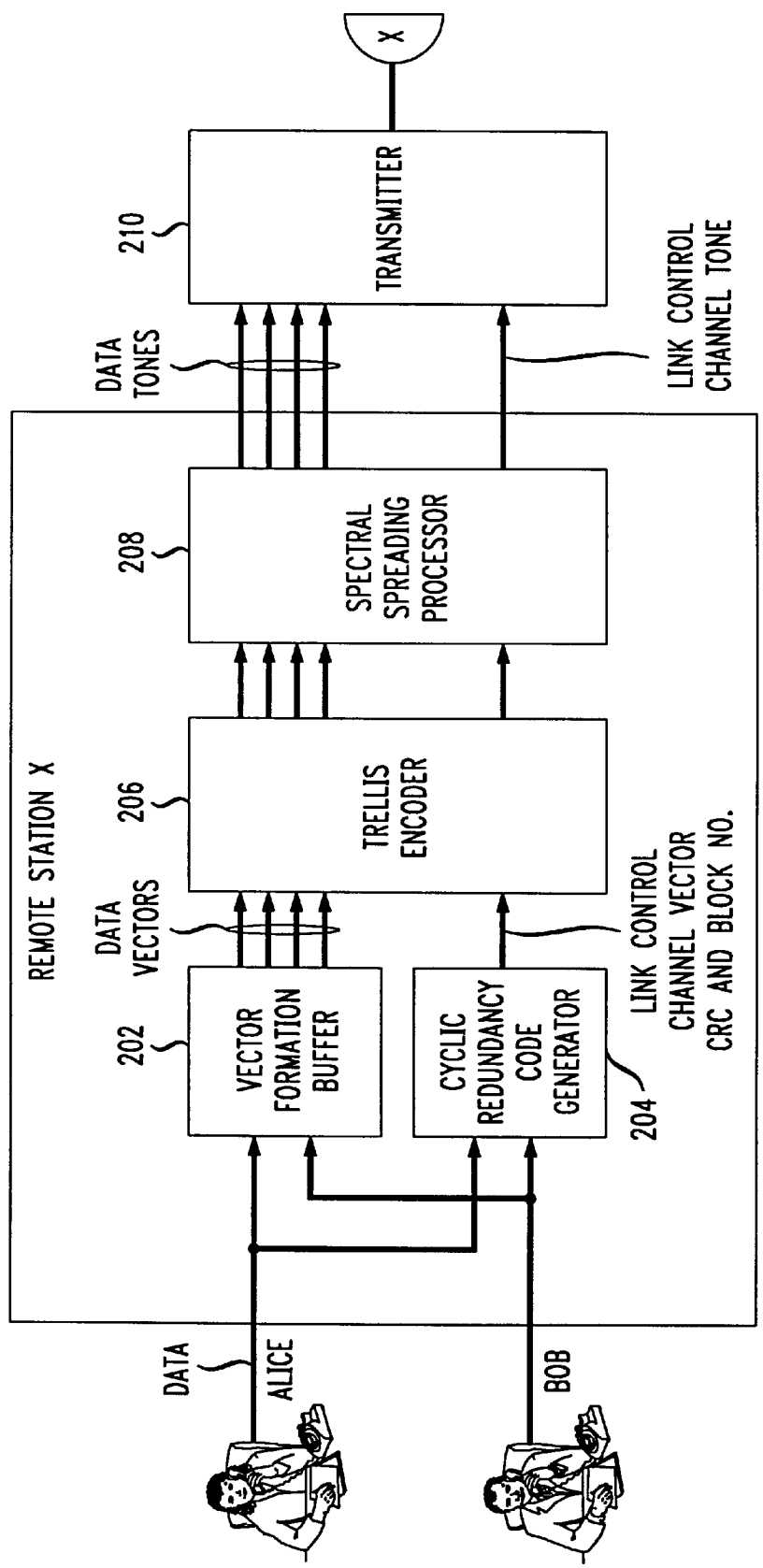
FIG. 2 is an architectural diagram of the remote station X as a sender.

FIG. 2 is an architectural diagram of the remote station X as a sender. Alice and Bob each input data to remote station X The data is sent to the vector formation buffer 202 and also to the cyclic redundancy code generator 204. Data vectors are output from buffer 202 to the trellis encoder 206. The data vectors are in the form of a data message formed by concatenating a 64K-bit data block with its serially assigned block number. The LCC vectors output from the CRC generator 204 to the trellis encoder 206 are in the form of an error detection message formed by concatenating the CRC value with the block number. The trellis encoded data vectors and LCC vectors are then output to the spectral spreading processor 208. The resultant data tones and LCC tones are then output from processor 208 to the transmitter 210 for transmission to the base station.

Figure 7:
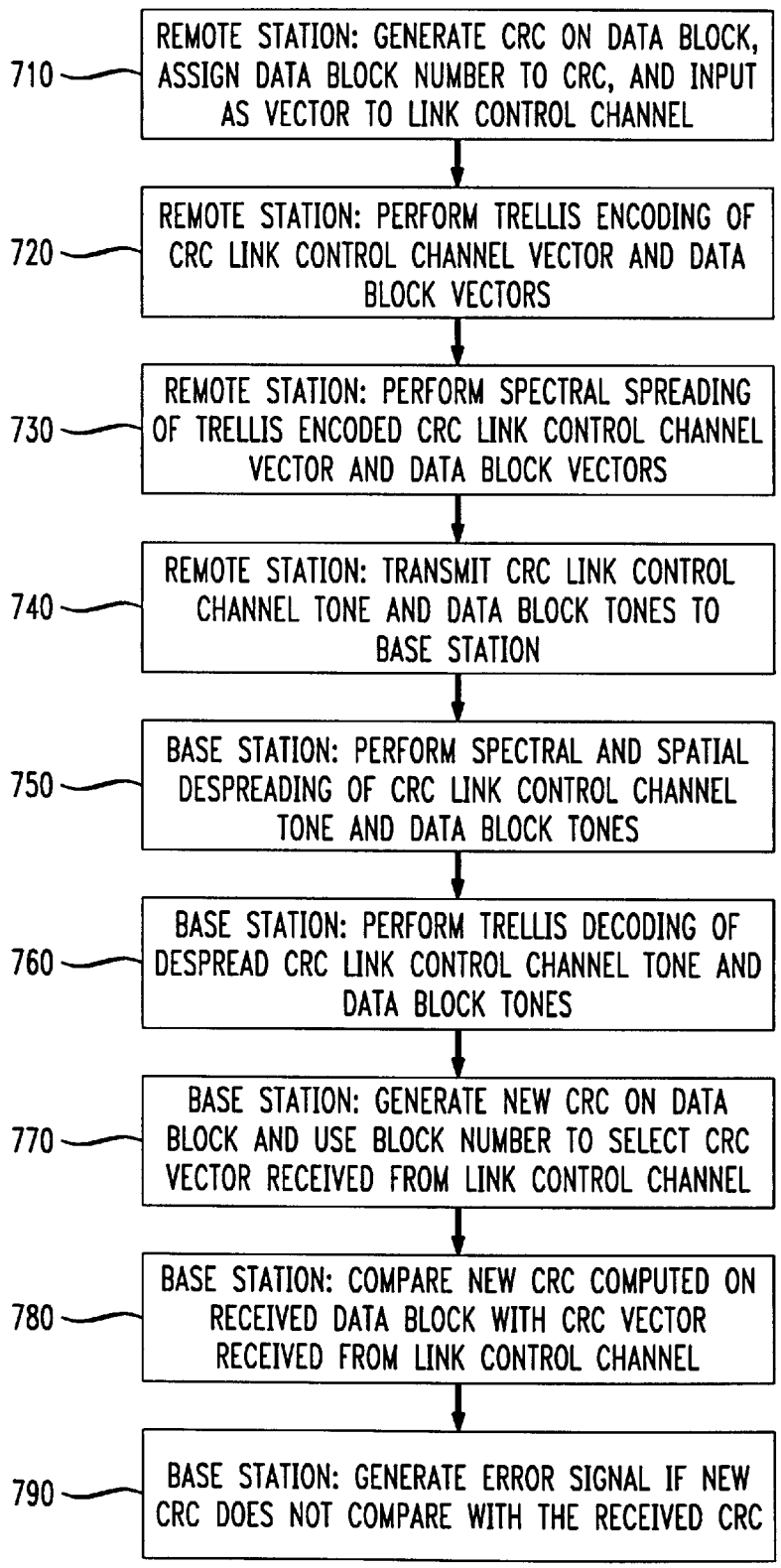
FIG. 7 is a flow diagram showing the remote station as the sender and the base station as the receiver.

The first four steps in the flow diagram 700 of FIG. 7 show the steps at remote station X when it is the sender. The steps in the method of transmission from a remote station to a base station are first for the Remote Station in step 710 to generate a CRC value on the data block, assign a data block number to the CRC value, and concatenate the CRC value and the block number in a error message which is input as a vector to the link control channel (LCC). Then in step 720, the Remote Station performs trellis encoding of the CRC link control channel vector and the data block vectors. Then in Step 730, the Remote Station performs spectral spreading of the trellis encoded CRC link control channel vector and data block vectors. Then in Step 740, the Remote Station transmits the CRC link control channel tone and data block tones to the base station.

The personal wireless access network (PWAN) system described in the referenced Alamouti, Stolarz, et al. patent applications provides a more detailed description of a high capacity mode, where one traffic partition is used in one traffic channel. The Base transmits information to multiple Remote Units in its cell. The transmission formats are for a 64 kbits/sec traffic channel, together with a 4 kbps Link Control Channel (LCC) between the Base and a Remote Unit. The binary source delivers data to the sender's transmitter at 64 kbits/sec. This translates to 48 bits in one transmission burst. The information bits are encrypted according to a triple data encryption standard (DES) algorithm. The encrypted bits are then randomized in a data randomization block. A bit to octal conversion block converts the randomized binary sequence into a sequence of 3-bit symbols. The symbol sequence is converted into 16 symbol vectors. The term vector generally refers to a column vector which is generally complex. One symbol from the LCC is added to form a vector of 17 symbols.

The 17-symbol vector is trellis encoded. The trellis encoding starts with the most significant symbol (first element of the vector) and is continued sequentially until the last element of the vector (the LCC symbol). This process employs convolutional encoding that converts the input symbol (an integer between 0 and 7) to another symbol (between 0 and 15) and maps the encoded symbol to its corresponding 16 QAM (or 16PSK) signal constellation point. The output of the trellis encoder is therefore a vector of 17 elements where each element is signal within the set of 16 QAM (or 16PSK) constellation signals. (The term signal will generally refer to a signal constellation point.)

A link maintenance pilot signal (LMP) is added to form an 18-signal vector, with the LMP as the first elements of the vector. The resulting (18×1) vector is pre-multiplied by a (18×18) forward smearing matrix to yield a (18×1) vector b.

Vector b is element-wise multiplied by the (18×1) gain preemphasis vector to yield another (18×1) vector, c, where p denotes the traffic channel index and is an integer. Vector c is post-multiplied by a (1×32) forward spatial and spectral spreading vector to yield a (18×32) matrix R(p). The number 32 results from multiplying the spectral spreading factor 4 and spatial spreading factor 8. The 18×32 matrices corresponding to all traffic channels carried (on the same traffic partition) are then combined (added) to produce the resulting 18×32 matrix S.

The matrix S is partitioned (by groups of four columns) into eight (18×4) submatrices ($A_0$ to $A_7$). (The indices 0 to 7, corresponds to the antenna elements over which these symbols will eventually be transmitted.) Each submatrix is mapped to tones within one traffic partition.

A lower physical layer places the baseband signals in discrete Fourier transfer (DFT) frequency bins where the data is converted into the time domain and sent to its corresponding antenna elements (0 to 7) for transmission over the air.

This process is repeated from the, start for the next 48 bits of binary data to be transmitted in the next forward transmission burst.

Figure 3:
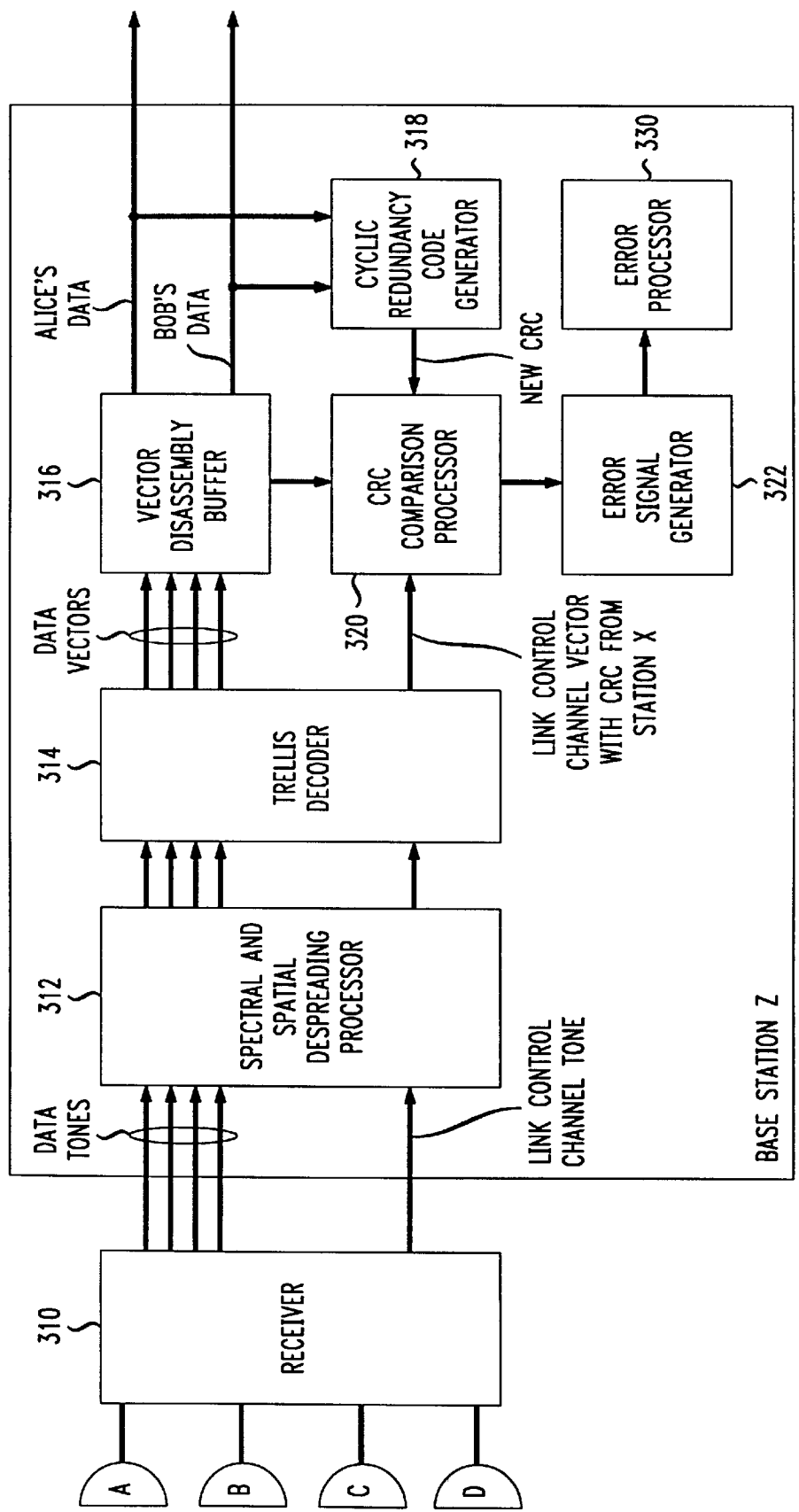
FIG. 3 is an architectural diagram of the base station Z as a receiver.
Figure 4:
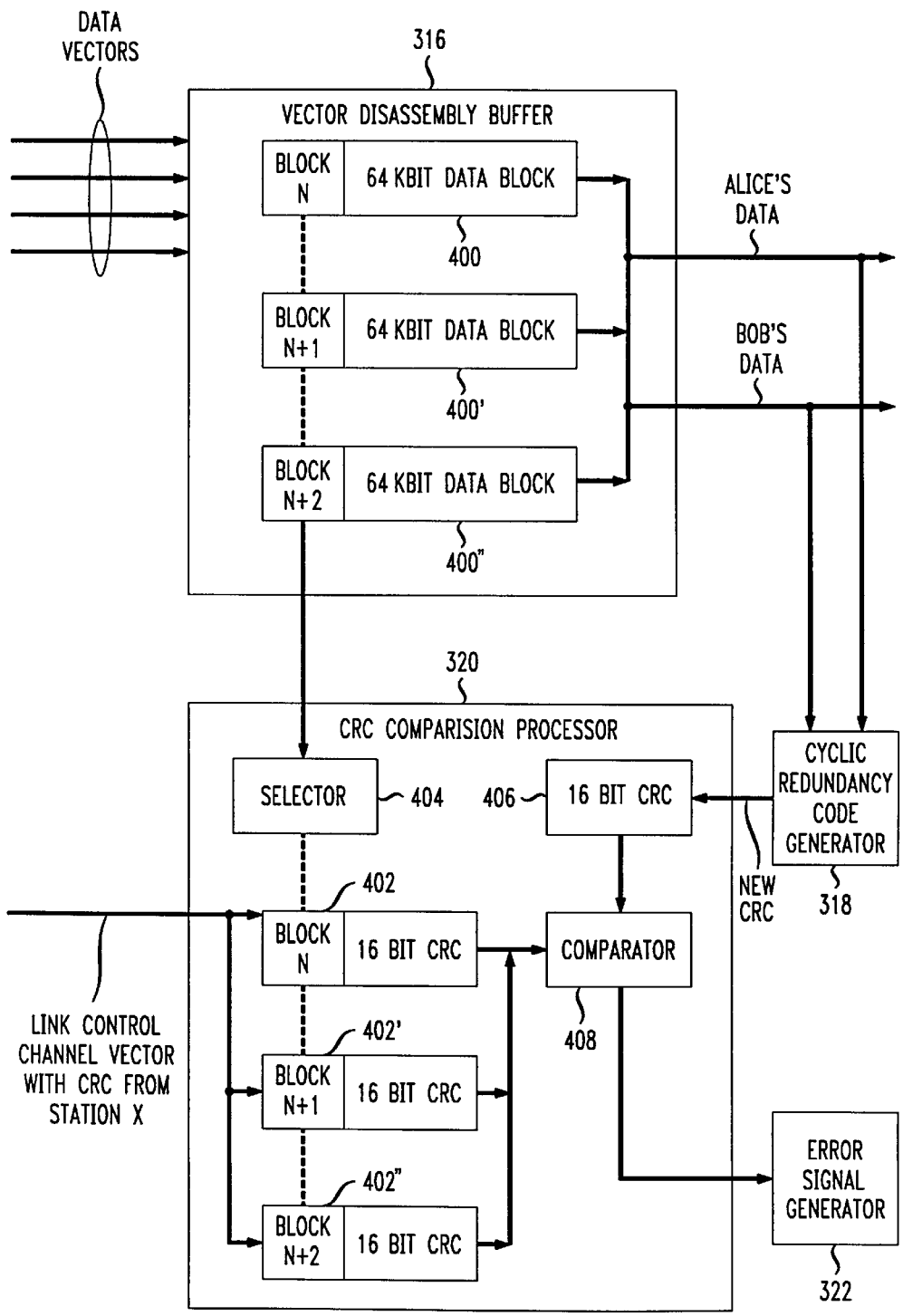
FIG. 4 is a more detailed architectural diagram of the vector disassembly and CRC comparison logic at a receiving station.

FIG. 3 is an architectural diagram of the base station Z as a receiver. The data tones and LCC tones are received at the base station antennas A, B, C, and D. The receiver 310 passes the data tones and the LCC tones to the spectral and spatial despreading processor 312. The despread signals are then output from the processor 312 to the trellis decoder 314 The data vectors 400, 400', and 400" are then output to the vector disassembly buffer 316, shown in greater detail in FIG. 4. The LCC vectors 400, 402', and 402" are output to the CRC comparison processor 320, shown in greater detail in FIG. 4. Alice's data and Bob's data are output from the buffer 316 to the public switched telephone network (PSTN). Alice's data and Bob's data are also input to the CRC generator 318. CRC generator 318 computes a new CRC value for every 64K-bit data block and outputs the new CRC value and the block number to the buffer 406 of the CRC comparison processor 320. FIG. 4 is a more detailed architectural diagram of the vector disassembly and CRC comparison logic at a receiving station. The receiving station buffers in the CRC comparison processor 320 the error detection messages it receives from the link control channel, so that they are accessible by their block numbers N, N+1, N+2, etc. When the receiving station receives a data message on the traffic channel, it performs a CRC calculation on the data block in the message with CRC generator 318 to obtain a resulting new CRC value. The new CRC value is buffered in buffer 406 at the receiving station with the block number so that it is accessible by its block number. Then, when both the received error message and the new CRC value are both available at the receiving station, they are matched by selector 404 by their common block number. The received CRC value in the error detection message 402 is compared with the new CRC computed from the received data block 400 by means of the comparator 408. If the comparison determines that there is a difference in the values, then an error signal is generated by generator 322. The error signal can be processed and used in several ways by the error processor 330. The error signal can initiate a negative acknowledgement signal to be sent from the receiving station back to the sender requesting the sender to repeat the data block transmission. The error signal can initiate an update in the spreading and despreading weights at the receiving station in an effort to improve the signal and interference to noise ratio of the traffic channel. The error signal can initiate an alarm to be used for other realtime control. Or, the error signal can be logged for the compilation of a longer term report of the traffic channel quality.

The last five steps in the flow diagram of FIG. 7, show the base station as the receiver. In Step 750, the Base Station performs spectral and spatial despreading of the CRC link control channel tone and data block tones. Then, in Step 760, the Base Station performs trellis decoding of despread CRC link control channel tone and data block tones. Then in Step 770, the Base Station generates new a CRC value on the data block and uses the block number to select the corresponding CRC vector received from the link control channel. Then in Step 780, the Base Station compares the new CRC value computed on the received data block with the CRC vector received from the link control channel. Then in Step 790, the Base Station generates an error signal if the new CRC does not compare with the received CRC.

Figure 5:
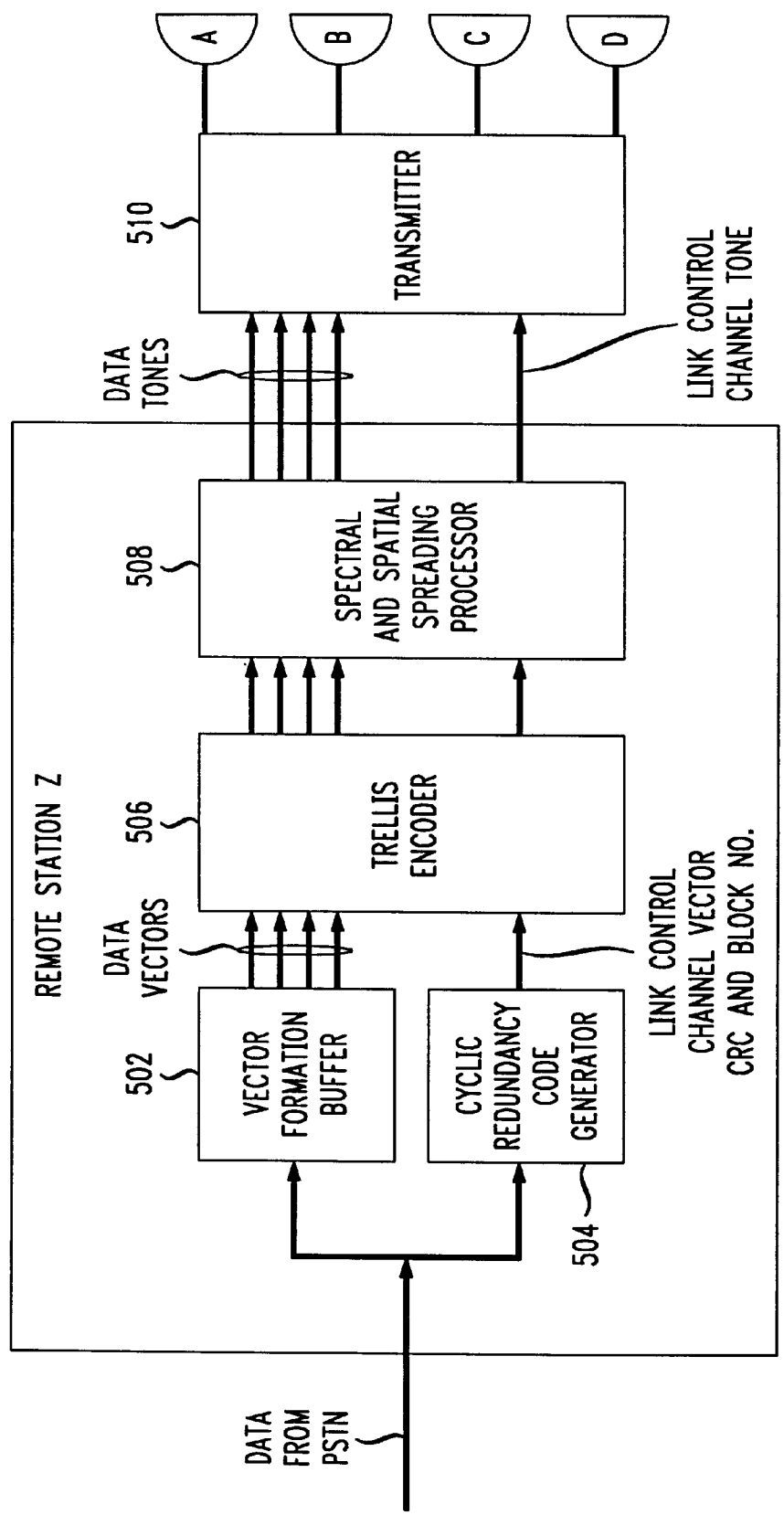
FIG. 5 is an architectural diagram of the base station Z as a sender.
Figure 6:
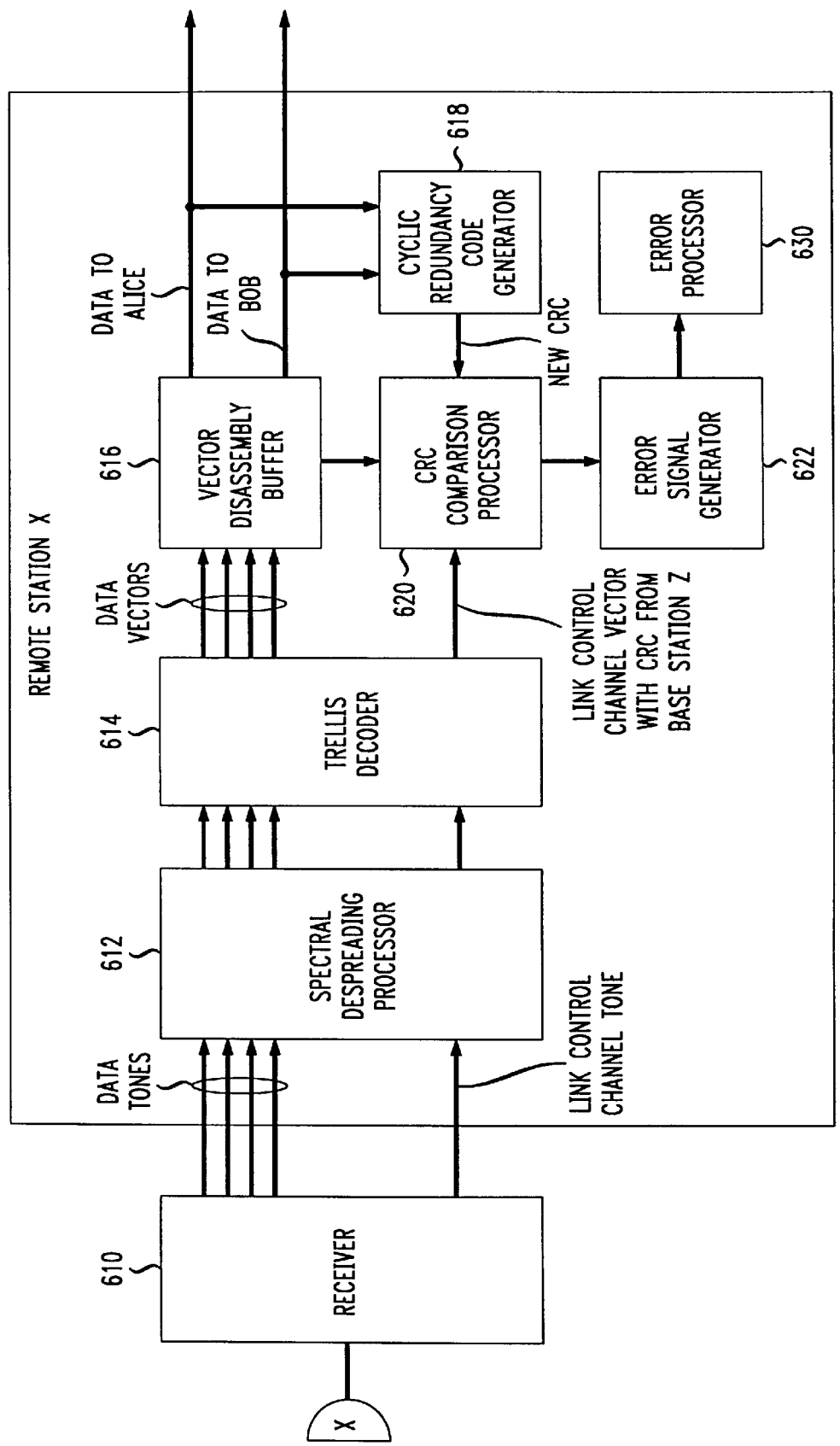
FIG. 6 is an architectural diagram of the remote station X as a receiver.
Figure 8:
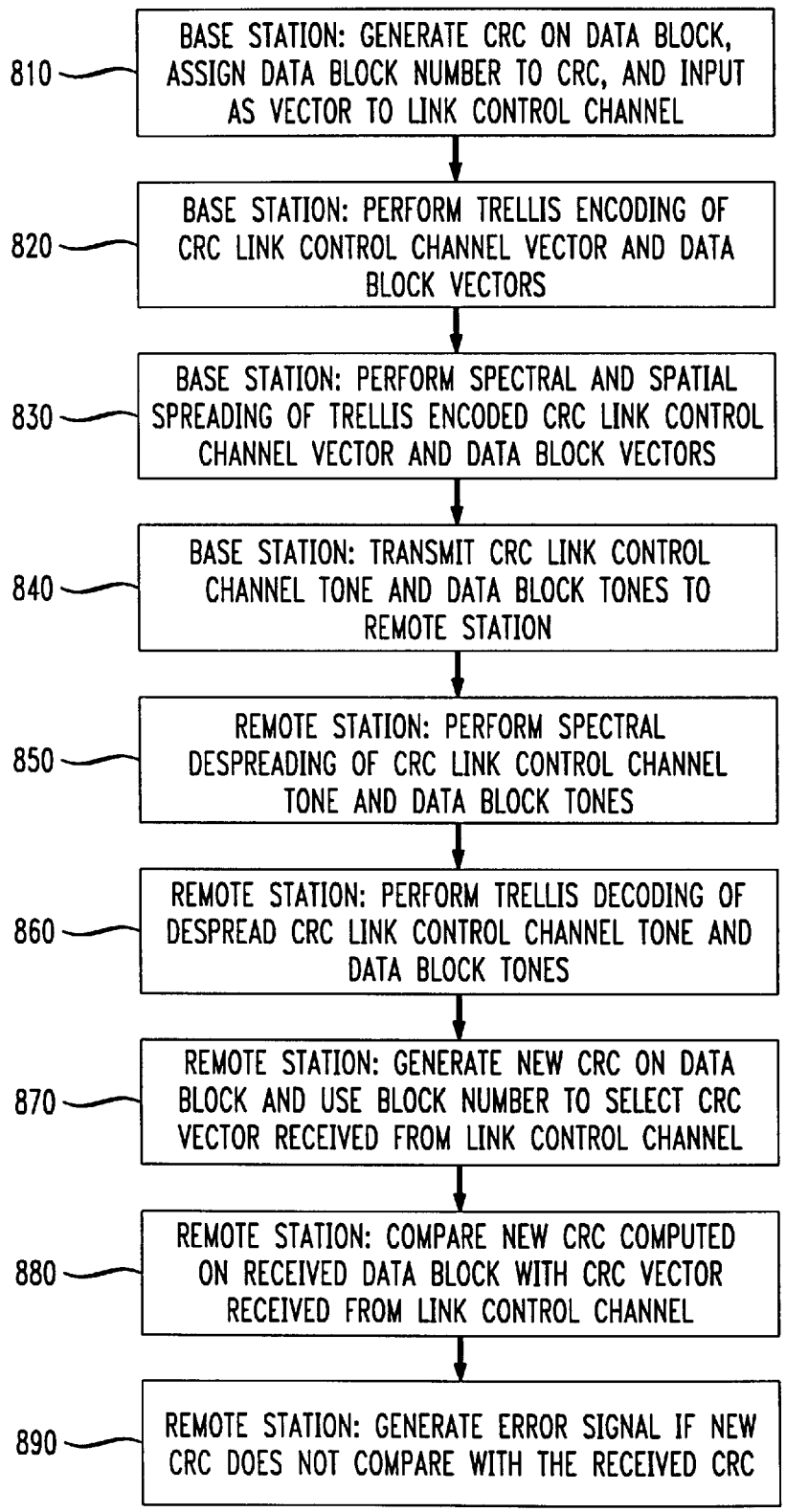
FIG. 8 is a flow diagram showing the base station as the sender and the remote station as the receiver.

FIG. 5 is an architectural diagram of the base station Z as a sender and FIG. 6 is an architectural diagram of the remote station X as a receiver. FIG. 8 is a flow diagram showing the base station as the sender and the remote station as the receiver. These three figures illustrate a communications direction opposite to that shown in FIGS. 2, 3, and 7. The same principle of the invention applies to FIGS. 5, 6, and 8 as the principles discussed for FIGS. 2, 3, and 7.

FIG. 5 is an architectural diagram of the base station as a sender. The PSTN inputs data to base station Z. The data is sent to the vector formation buffer 502 and also to the cyclic redundancy code generator 504. Data vectors are output from buffer 502 to the trellis encoder 506. The data vectors are in the form of a data message formed by concatenating a 64 K-bit data block with its serially assigned block number. The LCC vectors output from the CRC generator 504 to the trellis encoder 506 are in the form of an error detection message formed by concatenating the CRC value with the block number. The trellis encoded data vectors and LCC vectors are then output to the spectral and spatial spreading processor 508. The resultant data tones and LCC tones are then output from processor 508 to the transmitter 210 for transmission to the remote station.

The first four steps in the flow diagram 800 of FIG. 8 show the steps at base station Z when it is the sender. The steps in the method of transmission from a base station to a remote station are first for the Base Station in step 810 to generate a CRC value on the data block, assign a data block number to the CRC value, and concatenate the CRC value and the block number in a error message which is input as a vector to the link control channel (LCC). Then in step 820, the Base Station performs trellis encoding of the CRC link control channel vector and the data block vectors. Then in Step 830, the Base Station performs spectral spreading of the trellis encoded CRC link control channel vector and data block vectors. Then in Step 840, the Base Station transmits the CRC link control channel tone and data block tones to the remote station.

FIG. 6 is an architectural diagram of the remote station X as a receiver. The data tones and LCC tones are received at the remote station antenna X The receiver 610 passes the data tones and the LCC tones to the spectral despreading processor 612. The despread signals are then output from the processor 612 to the trellis decoder 614. The data vectors 400 400', and 400" of FIG. 4 are then output to the vector disassembly buffer 616, shown in greater detail in FIG. 4. The LCC vectors 402, 402', and 402" are output to the CRC comparison processor 620, shown in greater detail in FIG. 4. Data to Alice and data to Bob are output from the buffer 616 to Alice and to Bob. Data to Alice and Bob are also input to the CRC generator 618 CRC generator 618 computes a new CRC value for every 64 K-bit data block and outputs the new CRC value and the block number to the buffer 406 of the CRC comparison processor 620. FIG. 4 is a more detailed architectural diagram of the vector disassembly and CRC comparison logic at a receiving station. The receiving station buffers in the CRC comparison processor 620 the error detection messages it receives from the link control channel, so that they are accessible by their block numbers N, N+1, N+2, etc. When the receiving station receives a data message on the traffic channel, it performs a CRC calculation on the data block in the message with CRC generator 618 to obtain a resulting new CRC value. The new CRC value is buffered in buffer 406 at the receiving station with the block number so that it is accessible by its block number. Then, when both the received error message and the new CRC value are both available at the receiving station, they are matched by selector 404 by their common block number. The received CRC value in the error detection message 402 is compared with the new CRC computed from the received data block 400 by means of the comparator 408. If the comparison determines that there is a difference in the values, then an error signal is generated by generator 622. The error signal can be processed and used in several ways by the error processor 630. The error signal can initiate a negative acknowledgement signal to be sent from the receiving station back to the sender requesting the sender to repeat the data block transmission. The error signal can initiate an update in the spreading and despreading weights at the receiving station in an effort to improve the signal and interference to noise ratio of the traffic channel. The error signal can initiate an alarm to be used for other realtime control. Or, the error signal can be logged for the compilation of a longer term report of the traffic channel quality.

The last five steps in the flow diagram of FIG. 8, show the remote station as the receiver. In Step 850, the Remote Station performs spectral and spatial despreading of the CRC link control channel tone and data block tones. Then, in Step 860, the Remote Station performs trellis decoding of despread CRC link control channel tone and data block tones. Then in Step 870, the Remote Station generates new a CRC value on the data block and uses the block number to select the corresponding CRC vector received from the link control channel. Then in Step 880, the Remote Station compares the new CRC value computed on the received data block with the CRC vector received from the link control channel. Then in Step 890, the Remote Station generates an error signal if the new CRC does not compare with the received CRC.

Still another alternate embodiment applies the above described invention in the PWAN Frequency Division Duplex Communications System described in the Alamouti, Michaelson et al. patent application cited above.

Although the preferred embodiments of the invention have been described in detail above, it will be apparent to those of ordinary skill in the art that obvious modifications may be made to the invention without departing from its spirit or essence. Consequently, the preceding description should be taken as illustrative and not restrictive, and the scope of the invention should be determined in view of the following claims.

What is claimed is:

1. A communications method, comprising:
   receiving at a station a wireless signal comprising an incoming data message including a data block and a block number in a first channel;
   receiving at the station a wireless signal comprising an incoming error detection message including the block number and a first error detection code derived from the data block in a second channel;
   computing a second error detection code for the received data block;
   selecting the first error detection code using the block number received in the data message;
   comparing the first error detection code with the second error detection code and
   generating an error response signal at the station in response to the first error detection code being different from the second error detection code.

2. The communications method of claim 1, wherein the second error detection code is a checksum resulting from the operation of a polynomial generator on the data block.

3. The communications method of claim 1, wherein the second error detection code is a cyclic redundancy code.

4. The communications method of claim 1, which further comprises:
   prior to comparing the first error detection code with the second error detection code, buffering the first error detection code.

5. A communications method, comprising:
   receiving at a station a wireless signal comprising an incoming data message including a data block and a block number in a first frequency channel;
   receiving at the station a wireless signal comprising an incoming error detection message including the block number and a first error detection code derived from the data block in a second frequency channel;
   computing a second error detection code for the received data block;
   selecting the first error detection code using the block number received in the data message;
   comparing the first error detection code with the second error detection code; and
   generating an error response signal at the station in response to the first error detection code being different from the second error detection code.

6. The communications method of claim 5, wherein the second error detection code is a checksum resulting from the operation of a polynomial generator on the data block.

7. The communications method of claim 5, wherein the second error detection code is a cyclic redundancy code.

8. The communications method of claim 5, which further comprises:
   prior to comparing the first error detection code with the second error detection code, buffering the first error detection code.

9. A communications method, comprising:
   receiving at a station a first spread signal comprising an incoming data traffic signal in a first channel having a data block portion and a block number portion spread over a plurality of discrete frequencies;
   receiving at the station a second spread signal comprising an incoming error detection signal in a second channel having an error detection portion and the block number portion spread over a plurality of discrete frequencies, the error detection portion being derived from the data block portion;
   adaptively despreading the first spread signal received at the station by using despreading weights, recovering the data block portion and the block number portion;
   computing an error detection value for the data block portion at the station;
   adaptively despreading the second spread signal received at the station by using despreading weights, recovering the error detection portion and the block number portion;
   selecting the error detection portion using the block number portion received in the data traffic signal;
   comparing the error detection value with the error detection portion at the station;
   generating an error response signal at the station in response to the error detection value not comparing with the error detection portion.

10. The communications method of claim 9, which further comprises:
    prior to comparing the error detection value with the error detection portion at the station, buffering the error detection signal.

* * * * *